United States Patent [19]

Stude et al.

[11] Patent Number: 5,004,414

[45] Date of Patent: Apr. 2, 1991

[54] APPARATUS FOR FILTERING PLASTICIZED MATERIALS IN EXTRUDERS AND LIKE MACHINES

[75] Inventors: Rolf-Rüdiger Stude; Ludger Wilken-Trenkamp, both of Münster, Fed. Rep. of Germany

[73] Assignee: Kreyenborg Verwaltungen und Beteiligungen KG, Münster, Fed. Rep. of Germany

[21] Appl. No.: 446,557

[22] Filed: Dec. 5, 1989

[30] Foreign Application Priority Data

Dec. 5, 1988 [DE] Fed. Rep. of Germany ....... 3840904

[51] Int. Cl.[5] .................... B29C 47/34; B01D 33/35
[52] U.S. Cl. .................................. 425/185; 210/108; 210/236; 210/333.01; 425/190; 425/198; 425/199
[58] Field of Search ............... 425/198, 199, 185, 186, 425/190; 210/108, 234, 236, 333.1, 333.01

[56] References Cited

U.S. PATENT DOCUMENTS

| | | | |
|---|---|---|---|
| 3,940,222 | 2/1976 | Zink | 425/199 |
| 4,167,384 | 9/1979 | Shirato et al. | 425/199 |
| 4,597,870 | 7/1986 | Lambertus | 425/198 |
| 4,701,118 | 10/1987 | Köching | 425/185 |
| 4,725,215 | 2/1988 | Kreyenborg | 425/185 |
| 4,752,386 | 6/1988 | Schulz et al. | 425/199 |
| 4,814,186 | 3/1989 | Trott | 425/199 |

FOREIGN PATENT DOCUMENTS 0270501 6/1988 European Pat. Off. ............ 210/108

Primary Examiner—Jay H. Woo
Assistant Examiner—Khanh P. Nguyen
Attorney, Agent, or Firm—Peter K. Kontler

[57] ABSTRACT

Apparatus for filtering plasticized material between the inlet and the outlet of a housing has two parallel passages for reciprocable filter carriers each of which is movable between a first position and a second position. When in their first positions, the carriers permit plasticized material to flow from the inlet, through filters in their filter chambers and then into the outlet of the housing. If one of the carriers is moved to the second position while the other carrier remains in the first position, plasticized material which has been cleaned by passing through the filter of the other carrier is diverted in part into channels leading to the filter chamber of the one carrier, and such diverted material flows counter to the normal direction of flow of plasticized material through the chamber of the one carrier to entrain intercepted impurities and to expel the entrained impurities by way of a channel provided in the housing and being normally sealed from the chamber of the one carrier when the latter is maintained in the first position.

6 Claims, 3 Drawing Sheets

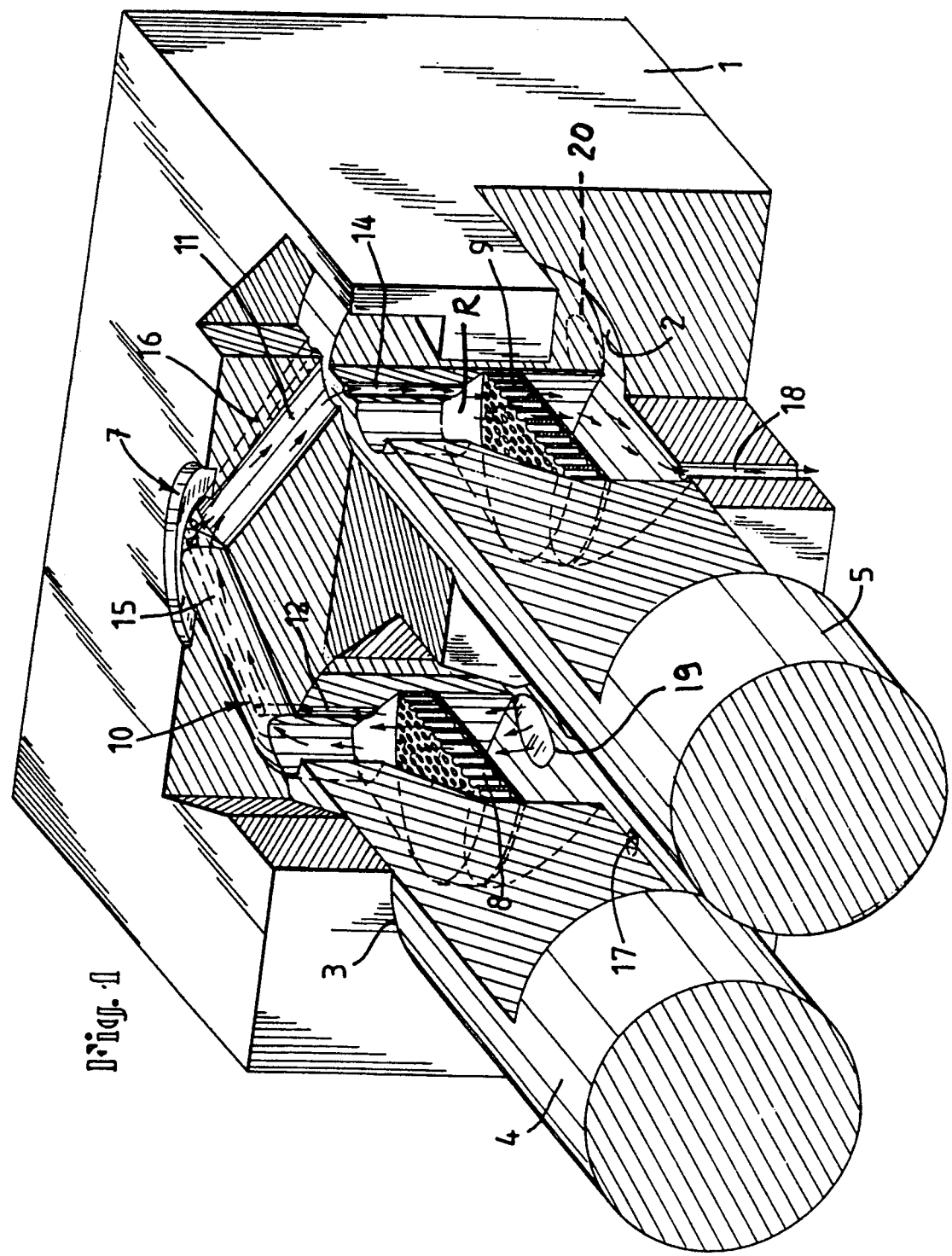

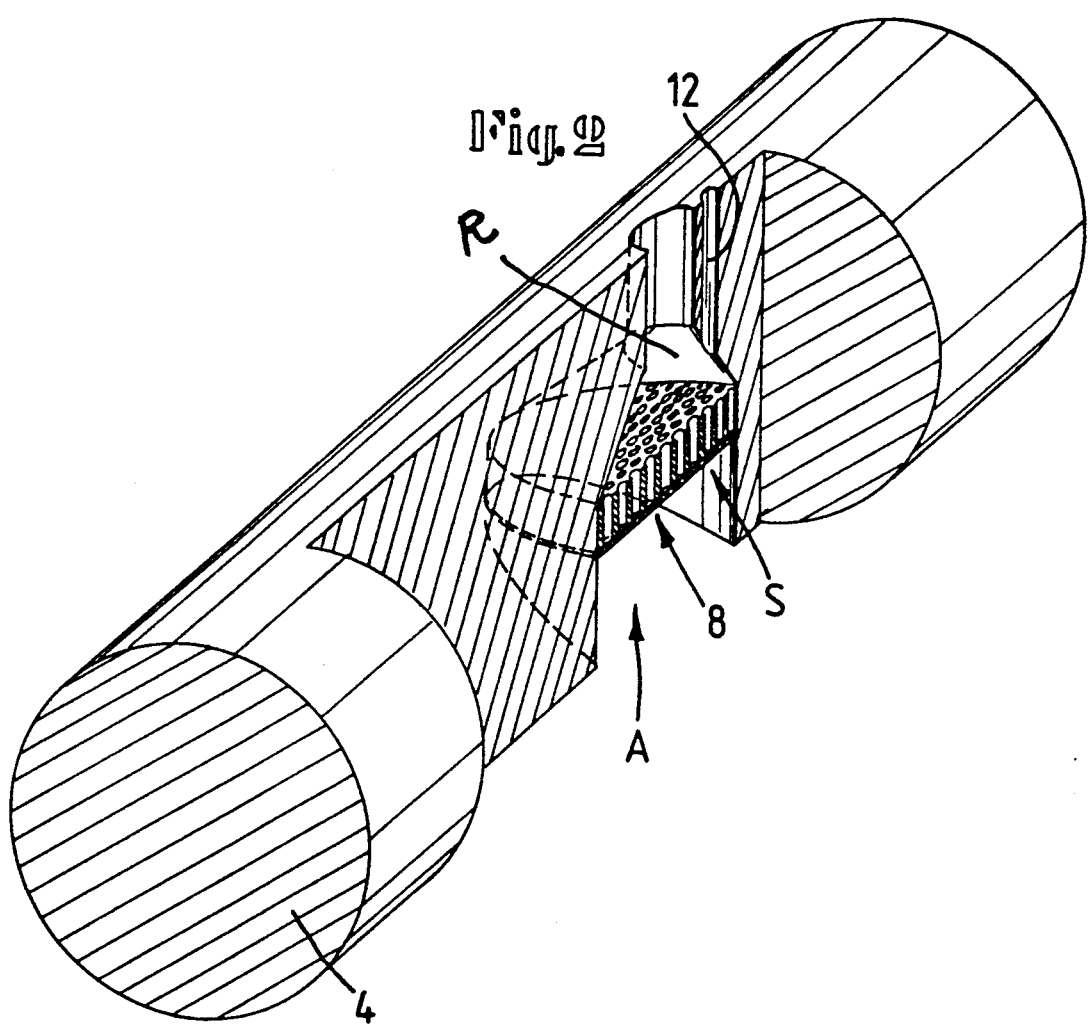

APPARATUS FOR FILTERING PLASTICIZED MATERIALS IN EXTRUDERS AND LIKE MACHINES

CROSS-REFERENCE TO RELATED CASES

Filtering apparatus of the type to which the present invention pertains are disclosed in commonly owned U.S. Pat. No. 4,701,118 granted Oct. 20, 1987 to Horst Köching et al. and in commonly owned U.S. Pat. No. 4,725,215 granted Feb. 16, 1988 to Udo Kreyenborg et al. The disclosures of these patents are incorporated herein by reference.

BACKGROUND OF THE INVENTION

The invention relates to improvements in apparatus for filtering plasticized materials in extruding, injection molding and like machines. Apparatus of such character are disclosed in the aforementioned commonly owned U.S. Pat. Nos. 4,701,118 and 4,725,215.

European Pat. No. 02 50 965 A 1 corresponding to U.S. Pat. No. 4,752,386 granted Jun. 21, 1988 to Schulz et al.) discloses a filtering apparatus wherein rod-like carriers of filters for plasticized material are provided with rinsing or flushing channels which communicate with the outlet of the housing for the filter carriers. The carriers have chambers for the respective filters, and the flushing channels are disposed between the outlet of the housing and those sides of the respective filters which confront the inflowing plasticized material, i.e., that mass of plasticized material which is about to pass through the filter on its way into the outlet. Such communication between a chamber and the outlet is established when the corresponding carrier is caused to assume a cleaning or flushing position, namely when the chamber is sealed from the outlet. The flushing channels direct contaminated plasticized material into a collecting space or into the atmosphere.

The apparatus of the European patent is capable of expelling impurities or contaminants from those sides of the filters which confront the inflowing plasticized material. This is achieved by forcing plasticized material to flow counter to the normal direction of flow in the chambers so that the plasticized material traverses the pores, interstices, orifices or otherwise configurated openings of the filters in a direction counter to that in which the material normally flows from the inlet toward the outlet of the housing. A drawback of such apparatus is that the flushing channels contain stagnant bodies of plasticized material when the respective filter carriers assume their normal positions, namely those positions in which plasticized material flows from the inlet of the housing, through the filters in the chambers of the carriers and on toward and into the outlet of the housing. In other words, each carrier contains a column of stagnant plasticized material which is maintained at an elevated temperature (because the carriers are very hot) and is likely to undergo cracking. Decomposed plasticized material is then admitted against the clean side of the respective filter and must be forced through the filter on its way out of the filtering apparatus. Thus, even though the patented apparatus enables plasticized material to expel contaminants from the "dirty" sides of the filters, such expulsion of contaminants involves filling the chambers at the clean sides of the filters with decomposed plasticized material. When the carrier (wherein the chamber at one side of the filter is filled with decomposed plastic material) thereupon reassumes its operative position, decomposed material is expelled from its chamber and is forced to enter the outlet of the housing, i.e., it is compelled to enter the extruding or injection molding machine.

OBJECTS OF THE INVENTION

An object of the invention is to provide a filtering apparatus for plasticized materials which is constructed and assembled in such a way that plasticized material is not permitted to decompose and/or to be otherwise adversely affected in the operative or any other positions of the filter carriers.

Another object of the invention is to provide a novel and improved method of expelling contaminants from the chambers of filter carriers in a filtering apparatus wherein a housing supports and guides a plurality of reciprocable and/or otherwise movable filter carriers.

A further object of the invention is to provide a filtering apparatus which is constructed and assembled in such a way that decomposed plasticized material is invariably prevented from entering the outlet which leads to an extruding, injection molding or other machine for the making of shaped plastic products.

An additional object of the invention is to provide the apparatus with novel and improved filter carriers.

Still another object of the invention is to provide a novel and improved housing for use in the above outlined filtering apparatus.

A further object of the invention is to provide an apparatus wherein the carriers of filters cooperate with each other to expel impurities from their filter-containing chambers.

An additional object of the invention is to provide a filtering apparatus wherein plasticized material is prevented from stagnating in the carriers and/or in the housing during any stage of operation of the apparatus.

A further object of the invention is to provide the apparatus with novel and improved means for ensuring continuous flow of plasticized material which enters the housing and/or the filter carriers.

SUMMARY OF THE INVENTION

The invention resides in the provision of an apparatus for filtering a flowable plastic material in an extruding or a like machine. The apparatus comprises a housing having an inlet and an outlet for plastic material and first and second passages extending between the inlet and the outlet, and first and second carriers which are respectively mounted in the first and second passages and are movable relative to the housing between first and second positions. Each carrier has a chamber and filter means in the chamber, and each chamber communicates with the inlet and with the outlet of the housing in the first position of the respective carrier so that a stream of plastic material can flow from the inlet, through the filter means in a first direction and into the outlet. The apparatus further comprises flushing means including means for establishing paths for the flow of plastic material through the filter means in a second direction counter to the first direction in the second positions of the carriers.

The path establishing means comprises channels which are provided in the carriers and in the housing. The first carrier must assume the first position to complete the establishment of a path for the flow of plastic material through the chamber of the second carrier in the second direction in the second position of the second carrier, and the second carrier must occupy the first position to complete the path for the flow of plastic material through the chamber of the first carrier in the second direction in the second position of the first carrier. The channels include first channels which are provided in the housing and communicate with the outlet of the housing, second channels which are provided in the carriers in permanent communication with the respective chambers and in communication with the first channels in the second positions of the respective carriers, and third channels which are provided in the housing and communicate with the chambers in the second positions of the respective carriers.

The arrangement is or can be such that the chambers of the first and second carriers communicate with each other by way of the channels (namely by way of the first and second channels) when one of the first and second carriers assumes the first position while the other of the first and second carriers assumes the second position.

The means for establishing paths for the flow of plastic material through the filter means in the chambers of the carriers comprises the aforementioned first and second channels which are respectively provided in the housing and in the carriers, and the aforementioned third channels which are provided in the housing and serve to evacuate contaminants from the chambers in the second positions of the respective carriers.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a fragmentary perspective view of a filtering apparatus which embodies the invention, with the housing and the filter carriers partially broken away, one of the filter carriers being shown in the first or operative position and the other filter carrier being shown in a second position for flushing of contaminants out of its filtering chamber;

FIG. 3 shows the housing in the view of FIG. 1 but with the filter carriers removed.

DESCRIPTION OF THE PREFERRED EMBODIMENTS

Figure 2:
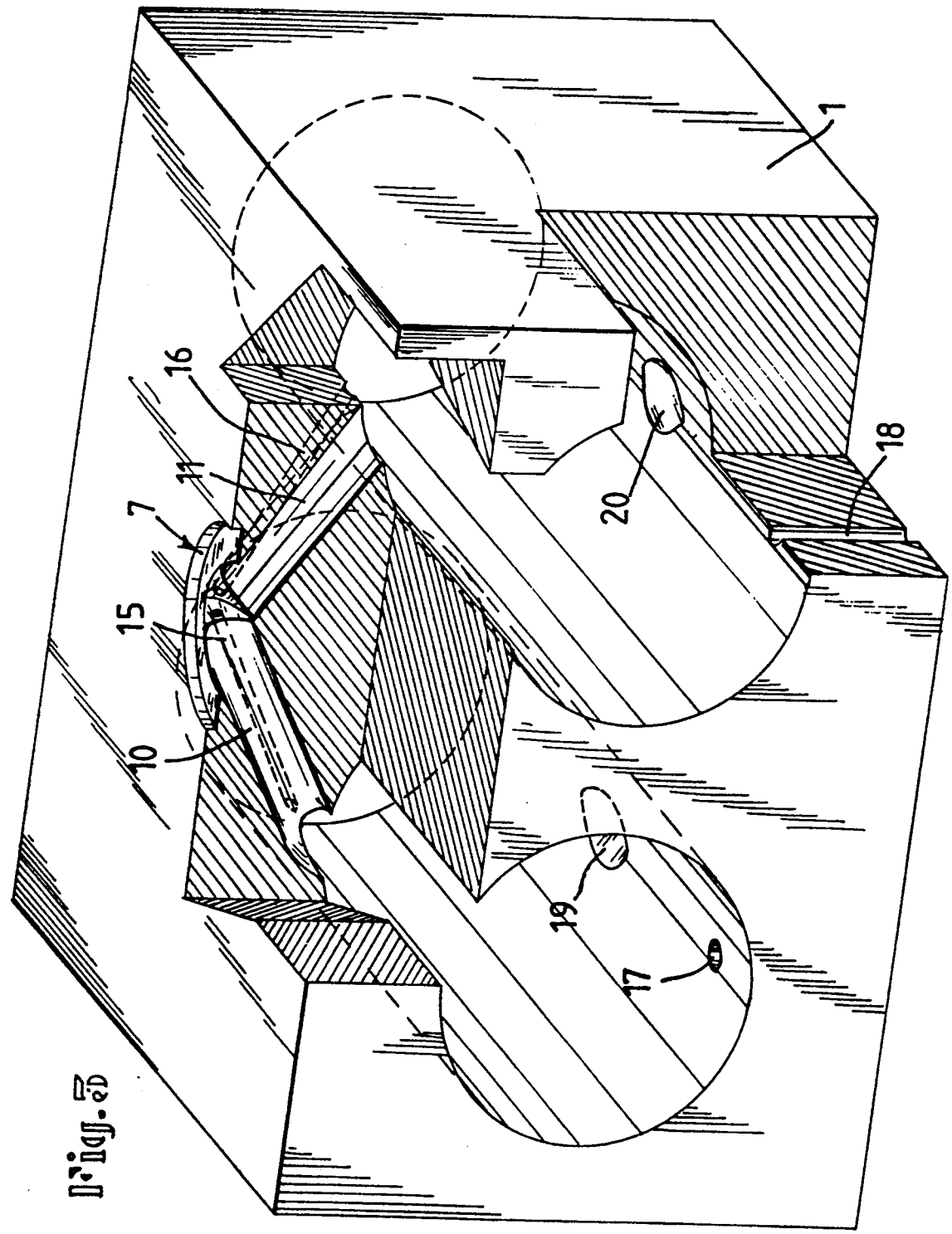
FIG. 2 is a fragmentary perspective view of one of the filter carriers with a portion broken away.

The filtering apparatus which is shown in FIG. 1 comprises a housing 1 (see also FIG. 3) and a plurality of (e.g., two) elongated rod-shaped filter carriers including the carriers 4, 5 which are shown in FIG. 1. The carrier 4 is also shown in FIG. 2. The housing 1 has parallel cylindrical passages 2 and 3 which reciprocably and sealingly receive the respective carriers 5, 4, and each of these carriers has a chamber A for a filter 8, 9, respectively. The carriers 4, 5 are reciprocable relative to the housing 1 by suitable hydraulic motor means (not shown) so that each carrier can assume a first or operative position (note the position of the carrier 4 in FIG. 1) and a second or flushing position (note the position of the carrier 5 in FIG. 1). Each of the filters 8, 9 comprises a sieve and a foraminous supporting plate for the sieve.

When the carrier 4 is maintained in the first position which is shown in FIG. 1, a stream of plasticized material can flow from the inlet (not shown) of the housing 1, through a bore or hole 19 which communicates with the inlet, and into the corresponding portion of the respective chamber A at the "dirty" side S of the filter 8. The filter 8 intercepts contaminants at the side S, and the plasticized material penetrates through such filter to enter the chamber portion at the clean side R of the filter prior to flowing toward and into the outlet 7 of the housing 1. The outlet 7 admits plasticized material into, or directs plasticized material toward, an extruding, injection molding or like machine. The means for conveying filtered plasticized material from the clean side R of the filter 8 into the outlet 7 comprises a channel 10 which is provided in the housing 1 and the intake end of which communicates with the chamber A of the carrier 4 when the latter is held in its first or operative position.

The housing 1 has a second bore or hole 20 which can convey unfiltered plasticized material from the non-illustrated inlet to the chamber A of the carrier 5 when the latter is maintained in the first or operative position. However, when the carrier 5 is held in the second or flushing position of FIG. 1, the material-receiving portion of its chamber A is sealed from the bore or hole 20 and the material discharging portion of the chamber A in the carrier 5 is sealed from the outlet 7, namely from a channel 11 provided in the housing 1, separate from the channel 10, and extending from the passage 2 to the outlet 7.

The heretofore described features are known in the art of apparatus for filtering plasticized materials ahead of extruding, injection molding and like machines.

In accordance with a feature of the invention, those portions of the chambers A in the carriers 4 and 5 which are adjacent the "dirty" sides S of the respective filters 8, 9 are relieved of collected impurities or contaminants in such a way that the plasticized material which is employed to expel impurities is not permitted to decompose prior to entering the chambers A at the clean sides R of the respective filters. Otherwise stated, the improved apparatus does not permit stagnation and overheating (and eventual cracking) of plasticized material in the housing 1 and/or in the carriers 4, 5. This effectively prevents penetration of decomposed material into the outlet 7 and thence into the processing machine. The means for flushing impurities or contaminants from the chambers A at the "dirty" sides S of the respective filters 8 and 9 includes channels 12, 14 which communicate with the respective channels 10, 11, which are respectively provided in the carriers 4, 5 and which serve to convey plasticized material toward the clean sides R of the respective filters 8, 9 in the second or flushing positions of the corresponding carriers. The channel 12 communicates with the respective chamber A and with a channel 15 which is provided in the housing 1 in parallelism with the channel 10 and discharges into the outlet 7 in the first position of the carrier 4. The channel 14 communicates with the respective chamber A and with the channel 11 of the housing 1 in the second position of the carrier 5. At the same time, a channel 16 (which is provided in the housing 1 in parallelism with the channel 11 and communicates with the outlet 7) is sealed from the channel 14. The housing 1 is cooler than the carriers 4, 5 so that the plasticized material in the channels 15, 16 is less likely to decompose than the material in the channel 12 or 14. The flushing means further comprises two channels 17, 18 which are provided in the housing 1. The channel 17 is sealed from the chamber A in the carrier 4 at the "dirty" side S of the respective filter 8 in the first position of the carrier 4, and the channel 18 receives plasticized material and contaminants from the chamber A of the carrier 5 at the "dirty" side S of the filter 9 in the second position of the carrier 5. At the same time, the channel 14 receives plasticized material from the bore 19, via chamber A of the carrier 4 and channels 10, 11 of the housing 1.

The filters 8, 9 are accessible for inspection or replacement in corresponding axial positions of the respective carriers 4, 5.

The operation is as follows:

It is assumed that the carrier 4 is held in the first position of FIG. 1 so that it enables plasticized material to flow from the source (not shown) to the inlet of the housing 1, through the bore 19, chamber A of the carrier 4, channel 10 and into the outlet 7. The plasticized material is conveyed at an elevated pressure. At the same time, a smaller stream of plasticized material flows from the upper portion of the chamber A in the carrier 4 (as seen in FIG. 1), through the channels 12, 15 into the outlet 7, and channels 10, 11 into the channel 14 which latter admits plasticized material into the upper portion of the chamber A in the carrier 5 (the carrier 5 is held in the second position of FIG. 1). Plasticized material which is admitted via channel 14 flows through the filter 9, removes contaminants at the "dirty" side S of this filter, and flows into the channel 18 to leave the housing 1 on its way to a collecting compartment or to another destination. The channel 16 (which is defined by the relatively cool housing 1) is sealed from the chamber A of the carrier 5. The channel 17 of the housing 1 is sealed from the chamber A of the carrier 4.

It will be noted that the plasticized material in the channel 12 is not at a standstill while the carrier 4 is held in the first or operative position. This prevents decomposition of such material when the carrier 4 permits the main stream of plasticized material to flow from the bore or hole 19 toward and into the outlet 7. At the same time, plasticized material in the channel 14 is also in motion and serves to evacuate impurities from the chamber A of the carrier 5 into the channel 18.

If the operator or an automatic control system thereupon causes the carrier 5 to move to the first or operative position (corresponding to the position of the carrier 4 in FIG. 1), the channel 18 is sealed from the chamber A of the carrier 5 and this chamber recieves plasticized material from the bore or hole 20. Such material flows upwardly (as seen in FIG. 1) through the lower portion of the respective chamber A (at the freshly cleaned side S of the filter 9) and into the channel 14 as well as into the channel 11 for admission into the outlet 7. The upper end of the channel 14 the communicates with the channel 16 which conveys plasticized material into the outlet 7. Thus, the flow of plasticized material in the channel 14 is merely reversed and such material is not permitted to dwell in the channel 14 irrespective of whether it flows toward or from the chamber A in the carrier 5. As mentioned above, the fact that the plasticized material is stagnant in the channel 16 in the second position of the carrier 5 is of no consequence, i.e., such material is not cracked (it does not decompose) because the housing 1 is cooler than the carriers.

If the carrier 4 is moved to the second position while the carrier 5 is held in its first or operative position, the channels 15, 12 receive plasticized material from the channel 11 to admit plasticized material into the upper portion of the chamber A in the carrier 4. Such material flows from the clean side R to the "dirty" side S of the filter 8 and entrains impurities from the lower portion of the chamber A in the carrier 4 into the channel 17 (which is then in register with such chamber). At the same time, the chamber A of the carrier 4 is sealed from the bore or hole 19.

An important advantage of the improved filtering apparatus is that decomposition of plasticized material in the housing 1 and/or in the carriers 4, 5 is prevented in a simple and reliable manner by the expedient of preventing stagnation of plasticized material in the carriers. Moreover, one of the carriers defines a portion of the path for the flow of plasticized material into the chamber of the other carrier for the purpose of expelling contaminants from the other carrier and vice versa. Furthermore, expulsion of impurities from the chamber of one of the carriers can take place while the other carrier is in the process of ensuring the admission of filtered plasticized material into the outlet 7. All this is accomplished with the novel expedient of ensuring that the channels 12, 14 cannot confine stagnant bodies of plasticized material because these channels serve to convey plasticized material into the respective chambers during flushing of impurities from such chambers and to convey plasticized material toward the outlet 7 when the respective carriers are maintained in their first positions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for filtering a flowable plastic material, comprising a housing having an inlet and an outlet for the plastic material and first and second passages extending between said inlet and said outlet; first and second carriers respectively mounted in said first and second carriers respectively mounted in said first and second passages and movable relative to said housing between first and second positions, each of said carriers having a chamber and filter means provided in the chamber for filtering said plastic material, each chamber communicating with said inlet and said outlet in the first position of the respective carrier so that a stream of plastic material can flow from said inlet, through the filter means in a first direction and into said outlet; through the filter means in a first direction and into said outlet; and means for flushing plastic material out of said chambers and out of the respective carriers, including means for establishing paths along which plastic material can flow through said filter means in a second direction counter to said first direction in the second positions of said carriers so that said plastic material in the respective carriers is completely expelled from the respective carriers before the carriers reassume said first positions wherein said paths are in fluid communication with said inlet and said outlet irrespective to the positions of said carriers.

2. The apparatus of claim 1, wherein the means respectively for establishing a path for the flow of plastic material through the filter means in the chamber of said first carrier includes first and second channel means provided in said housing and in said carriers to convey plastic material to the chambers of said carriers in said second direction, and third channel means provided in said housing to convey plastic material from the chambers of said carriers in said second direction in the second positions of the respective carriers.

3. The apparatus of claim 1, wherein said path establishing means includes channels provided in said carriers and in said housing, the first carrier being in the first position to complete the establishment of a path along which plastic material can flow through the chamber of the second carrier in said second direction in the second position of said second carrier and said second carrier being in the first position to complete the path along which plastic material can flow through the chamber of said first carrier in the second direction in the second position of said first carrier.

4. The apparatus of claim 3, wherein said channels include first channels provided in said housing and communicating with said outlet, second channels provided in said carriers in permanent communication with the respective chambers and communicating with said first channels in the second positions of the respective carriers, and third channels provided in said housing and communicating with said chambers in the second positions of the respective carrier.

5. The apparatus of claim 3, wherein the chambers of said carriers communicate with each other by way of said channels when one of the said carriers assumes said first position while the other of said carriers assumes said second position.

6. Apparatus for filtering a flowable plastic material in a processing machine, comprising a housing having two inlets for plastic material, at least one outlet for plastic material, first and second passages extending between said first and second inlets, respectively, and said at least one outlet, and first and second evacuating channels respectively communicating with said first and second passages; and first and second carriers respectively mounted in said first and second passages and being movable relative to said housing between first and second positions, said first and second carriers respectively having first and seconc chambers, first and second filters in the respective chambers, and first and second flushing channels communicating with the respective chambers, said carriers and said housing establishing first paths along which plastic material can flow from said first inlet through said first chamber and said first flushing channel to said at least one outlet as well as into the second evacuating channel by way of said second flushing channel and said second chamber when said first and second carriers respectively assume said first and second positions, said carriers and said housing establishing second paths along which plastic material can flow from said second inlet through said second chamber and said second flushing channel to said at least one outlet as well as into the first evacuating channel by way of said first flushing channel and said first chamber when said first and second carriers respectively assume said second and first positions.

* * * * *